US007924573B2

(12) United States Patent
Cheng

(10) Patent No.: US 7,924,573 B2
(45) Date of Patent: Apr. 12, 2011

(54) CARD CONNECTOR WITH EJECTOR

(75) Inventor: Yung-Chang Cheng, Tu-Cheng (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 807 days.

(21) Appl. No.: 11/823,060

(22) Filed: Jun. 26, 2007

(65) Prior Publication Data

US 2008/0123320 A1 May 29, 2008

(30) Foreign Application Priority Data

Jun. 26, 2006 (TW) .............................. 95211123 U

(51) Int. Cl.
*H05K 5/00* (2006.01)
(52) U.S. Cl. ........ 361/754; 361/752; 361/800; 439/157; 439/131; 439/325; 439/159; 439/630
(58) Field of Classification Search .................. 361/754, 361/752, 800; 439/630, 64, 79, 157, 159, 439/131, 325, 607
See application file for complete search history.

(56) References Cited

U.S. PATENT DOCUMENTS

| 6,988,904 B1 * | 1/2006 | Lai ................................ 439/159 |
| 7,081,021 B1 * | 7/2006 | Ting .............................. 439/630 |
| 7,090,537 B1 * | 8/2006 | Nakamura .................... 439/630 |
| 7,118,396 B2 * | 10/2006 | Ting .............................. 439/159 |
| 7,189,088 B2 * | 3/2007 | Cheng et al. ................. 439/159 |
| 7,232,320 B2 * | 6/2007 | Kuo .............................. 439/159 |
| 7,300,291 B2 * | 11/2007 | Kimura et al. ............... 439/131 |
| 7,414,854 B1 * | 8/2008 | Douglas ....................... 361/752 |
| 2005/0287870 A1 * | 12/2005 | Kuo .............................. 439/630 |
| 2006/0128189 A1 * | 6/2006 | Kuo et al. .................... 439/157 |
| 2006/0134989 A1 * | 6/2006 | Ting .............................. 439/630 |
| 2006/0154528 A1 * | 7/2006 | Watanabe .................... 439/630 |
| 2006/0194461 A1 * | 8/2006 | Kuo .............................. 439/157 |
| 2006/0205278 A1 * | 9/2006 | Kuo et al. .................... 439/630 |
| 2006/0246757 A1 * | 11/2006 | Ting et al. .................... 439/159 |
| 2007/0243735 A1 * | 10/2007 | Juang ........................... 439/159 |

* cited by examiner

*Primary Examiner* — Xiaoliang Chen
(74) *Attorney, Agent, or Firm* — Andrew C. Cheng; Wei Te Chung; Ming Chieh Chang

(57) ABSTRACT

A card connector adapted for receiving a card, comprises an insulating housing defining a card insertion/ejection direction; a plurality of contacts received in the insulating housing, a shell and an ejector. The shell covers the insulating housing and is formed with a receiving portion. The receiving portion comprises an upper portion, a lower portion opposite to the upper portion and a connecting portion connecting the upper portion and the lower portion. The ejector has a front end received and locked in the receiving portion of the shell.

10 Claims, 6 Drawing Sheets

CARD CONNECTOR WITH EJECTOR

BACKGROUND OF THE INVENTION

1. Field of the Invention

The present invention is generally related to a card connector, and more particularly, to a card connector which has an ejector.

2. Description of Related Art

With the development of electronic appliances, an express card connector has been widely used to achieve data transmission between an express card and a corresponding electronic appliance. In order to draw the express card out of the card connector conveniently, the express card connector will have an ejector to eject the express card.

At present, the express card connector has an insulating housing, a plurality of contacts received in the insulating housing, a shell covering the insulating housing and an ejector for ejecting a card out of the card connector. The ejector comprises a base defining a heart-shaped slot therein, a spring, an ejecting member and a pin member with one end connecting with the ejecting member and the other end moveably disposed in the heart-shaped slot. In order to hold the ejector securely, the shell defines mating holes to mate with wedges formed on the base. On the other hand, the base defines screw holes. Screws are held in the corresponding screw holes to hold the base. It is apparent that it needs much procedure to hold the ejector. Furthermore, the base must be cut internal thread to mate with the corresponding screws. Obviously, it increases difficulty and costs of manufacturing and assembly.

Hence, an improved card connector is required to overcome the disadvantages of the related art.

SUMMARY OF THE INVENTION

Accordingly, an object of the present invention is to provided a card connector which can hold an ejector simply and securely.

To achieve the above objects, a card connector adapted for receiving a card, comprises an insulating housing defining a card insertion/ejection direction; a plurality of contacts received in the insulating housing, a shell and an ejector. The shell covers the insulating housing and is formed with a receiving portion. The receiving portion comprises an upper portion, a lower portion opposite to the upper portion and a connecting portion connecting the upper portion and the lower portion. The ejector has a front end thereof received and locked in the receiving portion of the shell.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
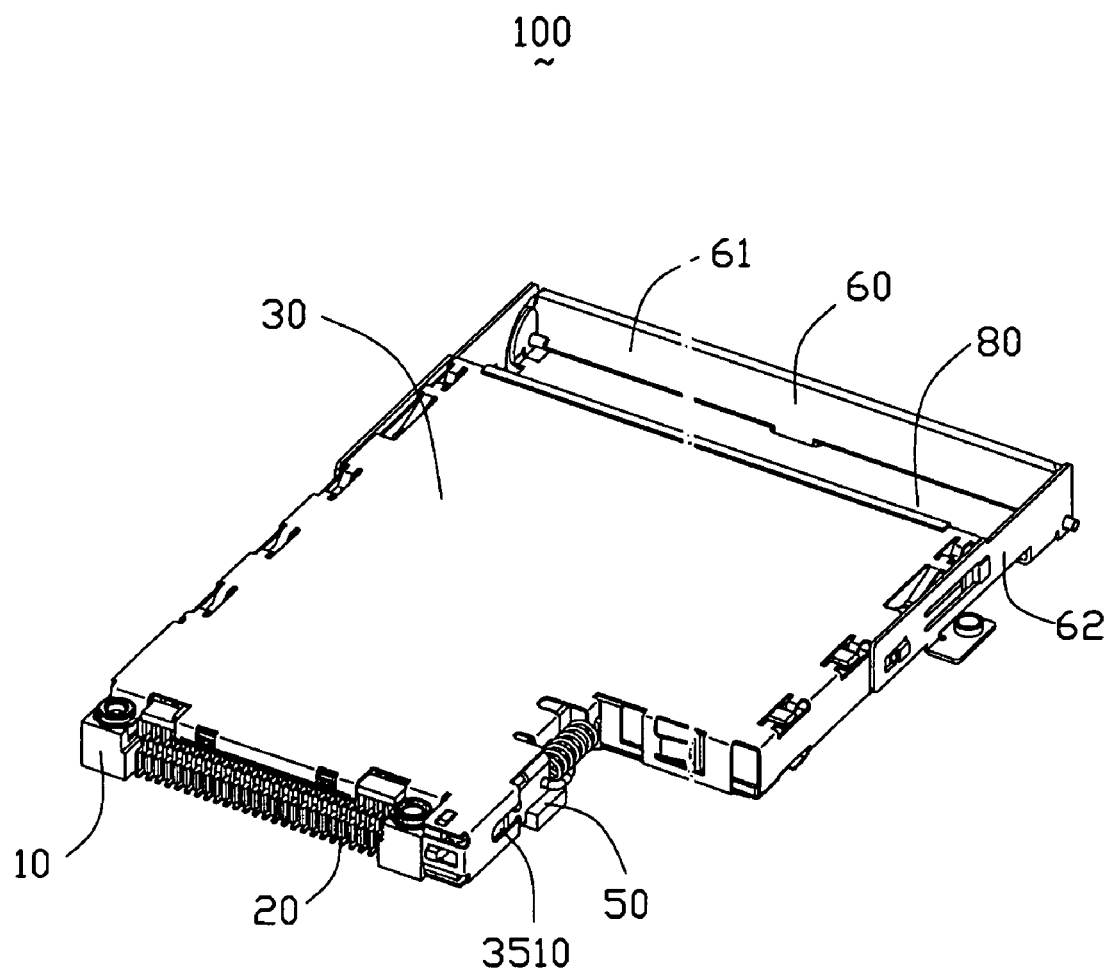
FIG. 1 is an assembled, perspective view of the card connector in accordance with the present invention.
Figure 2:
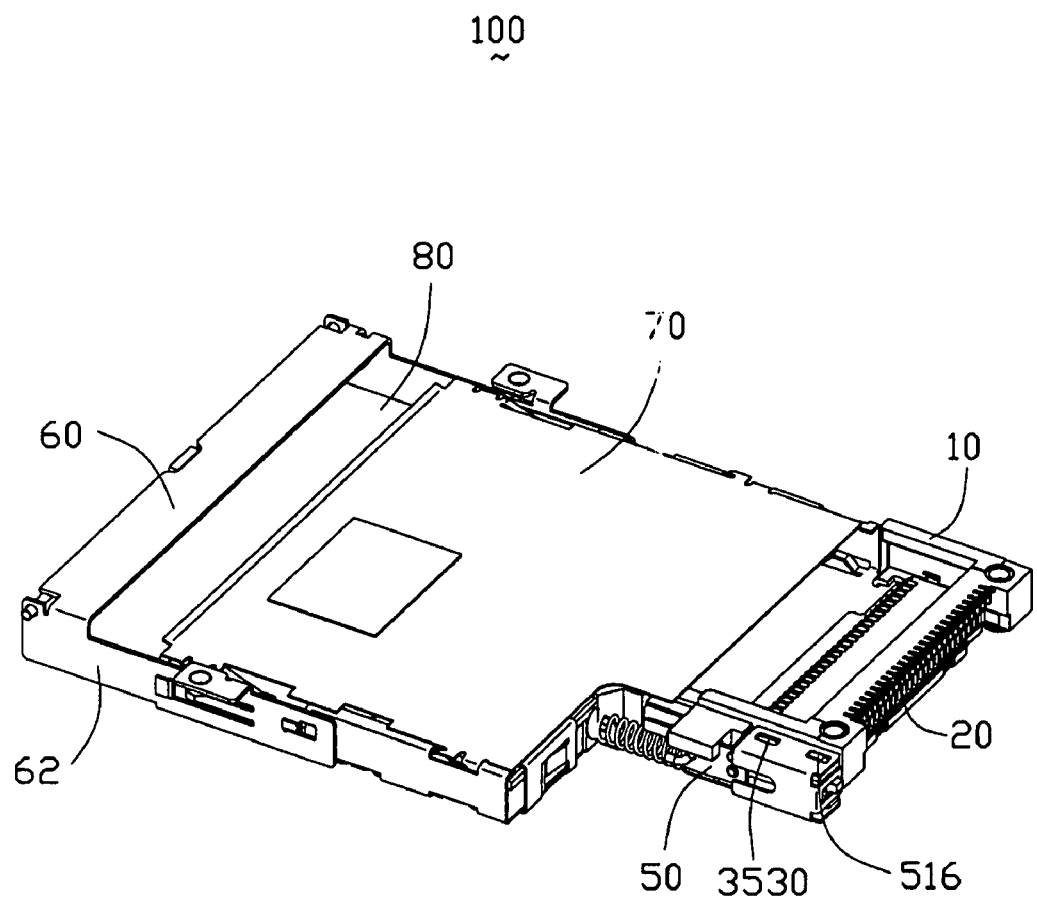
FIG. 2 is an assembled, perspective view similar to FIG. 1, but from another aspect.
Figure 3:
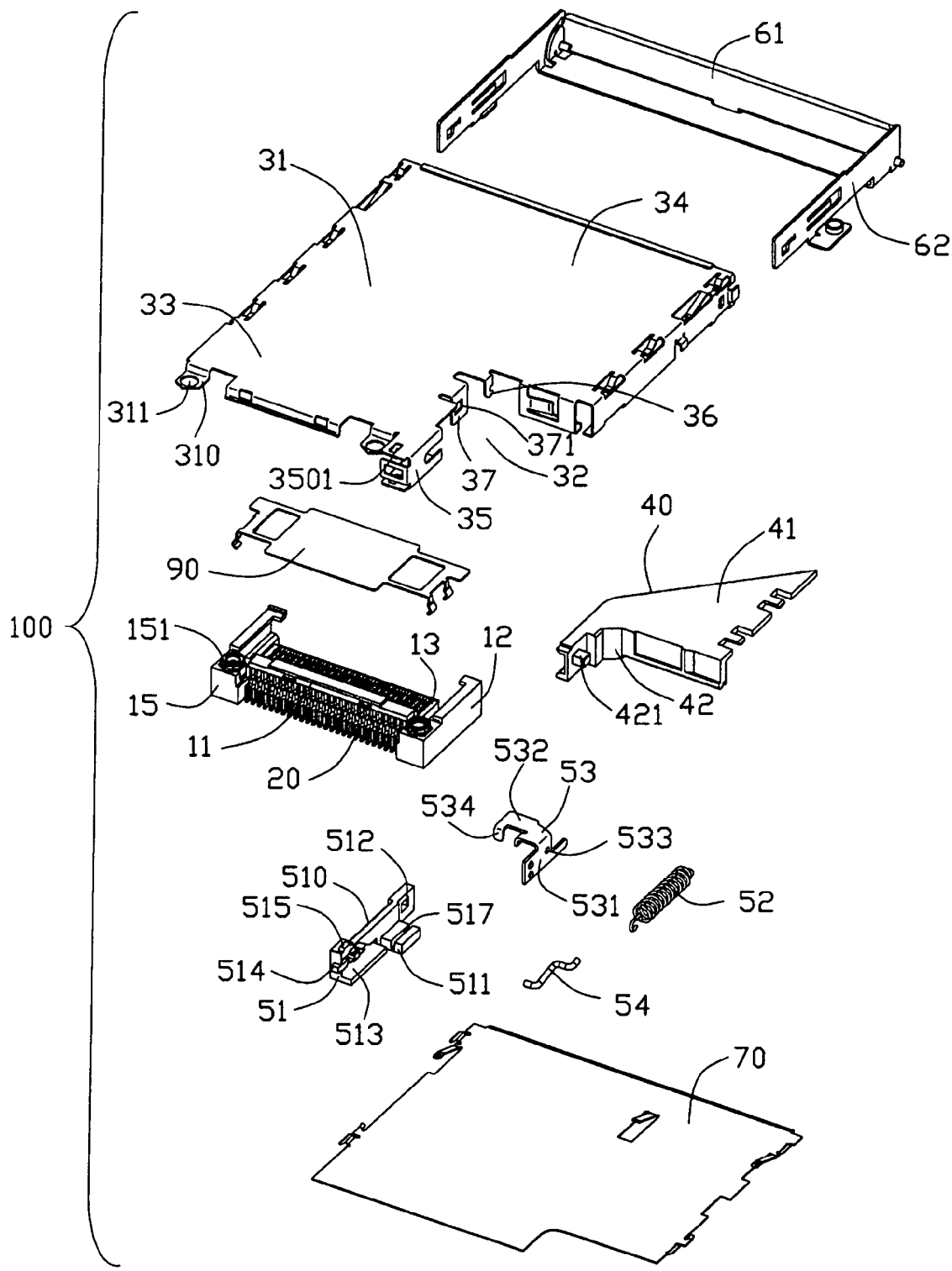
FIG. 3 is an exploded, perspective view of the card connector of FIG. 1.
Figure 4:
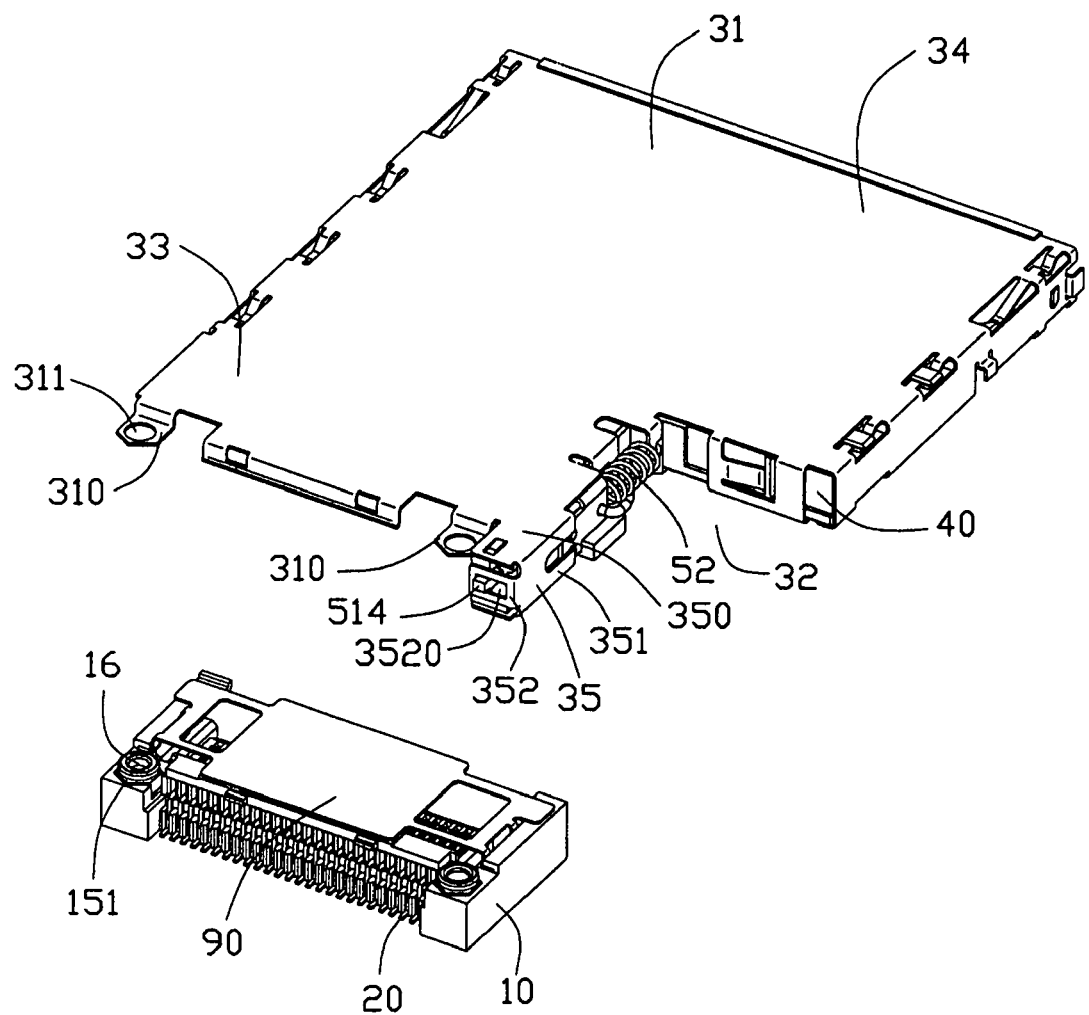
FIG. 4 is a partially assembled, perspective view of the card connector of FIG. 1.
Figure 5:
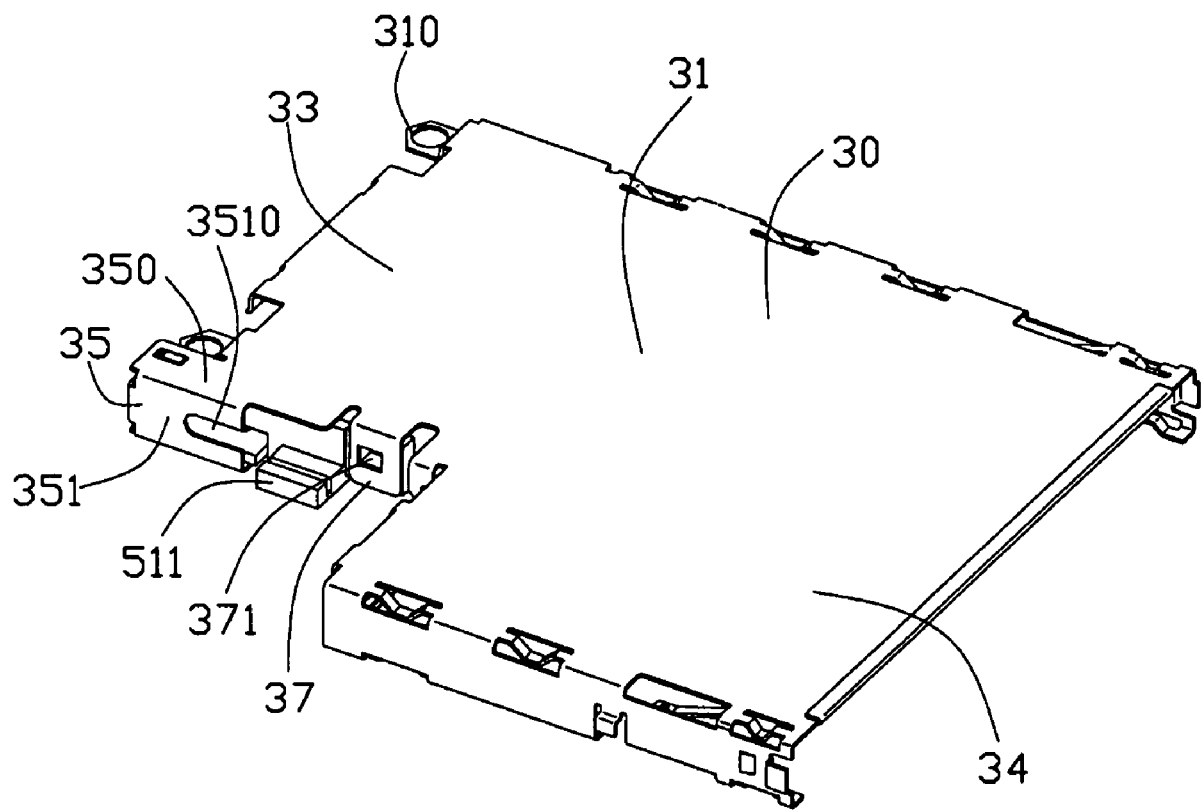
FIG. 5 is an assembled, perspective view of a shell and a base of an ejector of the card connector of FIG. 1.
Figure 6:
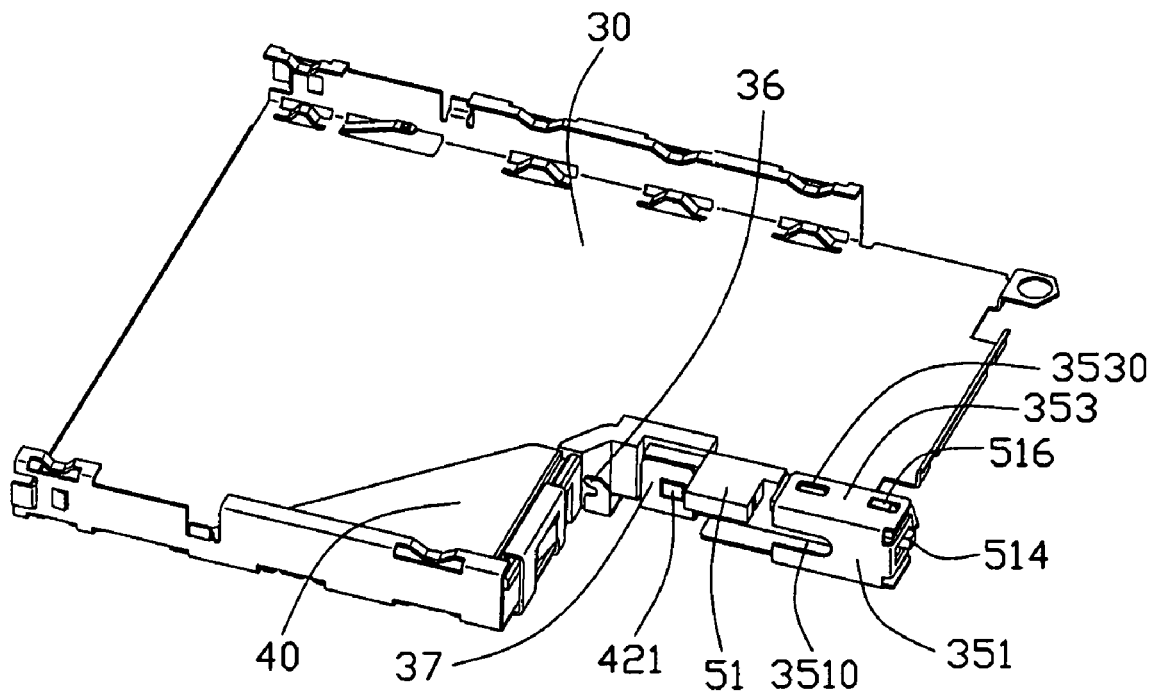
FIG. 6 is an assembled, perspective view of the shell, the base and a guide element of the card connector of FIG. 1.

Referring to FIGS. 1-6, a card connector of the present invention is adapted for receiving a rectangular express card or a L-shaped express card (not shown). The card connector comprises an elongated insulating housing 10, a plurality of contacts 20 received in, a shell 30, a guide element 40, an ejector 50, a protection door 60 assembled on a rear end of the shell 30 and a bottom plate 70 assembled on a bottom side of the shell 30.

Referring to FIGS. 1-6, The elongated insulating housing 10 has a base portion 11, a pair of guiding arms 12 and a pair of assembling portions 15 extending rearward and forwardly from opposite sides of the base portion 11 respectively. A mating portion 13 extends from a lower part of the base portion 11 and is disposed between the two guiding arms 12. The assembling portions 15 define column holes 151. The contacts 20 are received in the mating portion 13 and extend beyond the insulating housing 10 to be soldered on a circuit board (not shown).

The shell 30 covers the insulating housing 10 to define a card receiving space 80 with a card insertion opening (not labeled) therebetween. The shell 30 is L-shaped because the shell 30 defines a step portion 32 at a front end thereof. The L-shaped shell 30 comprises a main body 31 and sidewalls (not labeled) extending downwardly from the main body 31. The main body 31 comprises a front section 33 and a rear section 34 extending rearward from the front section 33. The width of the rear section 34 is wider than that of the front section 33 along a transverse direction perpendicular to a card insertion/ejection direction. A locking piece 36, a holding piece 37 with a receiving hole 371 thereon and a receiving portion 35 extend downwardly from a lateral side of the front section 33 adjacent to the step portion 32 and arrange along the card insertion direction. A pair of holding pieces 310 with through holes 311 are formed at opposite sides of a front end of the front section 33. Screws 16 are held in the column holes 151 of the insulating housing 10 and the through holes 311 of the shell 30 to assemble the shell 30 on the insulating housing 10. The receiving portion 35 is in alignment with the insulating housing 10 along the transverse direction and locates besides one of the holding pieces 310. The receiving portion 35 comprise an upper portion 350 which is a section of the front section 33 of the main body 31, a connecting portion 351 extending downwardly from a free end of the upper portion 350 and a lower portion 353 extending horizontally from a free end of the connecting portion 351 and opposite to the upper portion 350. The upper portion 350 and the lower portion 353 define mating holes 3501, 3530 respectively. The receiving portion 35 further comprises a holding portion 352 extending along the transverse direction from a front end of the connecting portion 351 and defining a holding hole 3520 thereon.

The protection door 60 comprises a pair of holding devices 62 assembled on a rear end of the shell 30 and a door plate 61 moveably assembled on the holding devices 62 to open/close the card insertion opening. A shielding piece 90 is disposed between the shell 30 and the insulating housing 10.

The guide element 40 is approximately a triangle shape and assembled to the shell 30 adjacent to the step portion 32. The guide element 40 has a board 41 and a L-shaped perpendicular wall 42 extending forwardly and downwardly from a front end of the board 70. The wall 42 is formed with a protrusion 421 at an outside thereof to be received in the receiving hole 371 of the holding piece 37.

The ejector 50 comprises a base 51, a resilient member 52, an ejecting member 53 and a pin member 54. In this embodiment, the resilient member 52 is a spring. The base 51 abuts against the guiding arm 12 adjacent to the guide element 40. The base 51 comprises a vertical portion 510 with a heart-shaped slot (not labeled) therein and horizontal portions 513, 511 extending outwardly from hemlines of front and rear ends of the vertical portion 510 respectively. The horizontal portion 511 defines a guiding slot 517 along the card insertion/ejection direction. The vertical portion 510 is formed with a protruding block 514 at a middle portion of the front end thereof to be held in the holding hole 3520 of the holding portion 352. A plurality of wedges 515, 516 protrude from an upper face and a lower face of the front end of the vertical portion 510 respectively and are received in the mating holes 3501, 3530 of the receiving portion 35. Thus, the front end of the vertical portion 510 and the horizontal portion 513 of the base 51 are received in the receiving portion 35 securely. Meanwhile, the rear end of the vertical portion 510 defines a rectangular hole 512. The protrusion 421 of the guide element 40 is received in the receiving hole 371 of the holding piece 37 after the protrusion 421 passes through the rectangular hole 512.

The ejecting member 53 is moveably assembled on the base 51. The ejecting member 53 comprises a sliding portion 531 sliding along the guiding slot 517, an intermediate portion 532 extending horizontally from an upper portion of the sliding portion 531 and an ejecting portion 534 extending downwardly from a free end of the intermediate portion 532 and exposed into the card receiving space 80 to eject a card directly.

One end of the pin member 54 locks in a hole 533 defined in the base 531 and the other end thereof is moveably received in the heart-shaped slot of the sliding portion 531. One end of the spring 52 locks on the locking portion 36 of the shell 30 and the other end thereof locks the pin member 54. The connecting portion 351 of the receiving portion 35 defines a cutout 3510 at a rear end thereof for movement of the pin member 54.

One feature of the invention is to have the moveable end of the resilient member 52 linked to a middle transverse section of the pin member 54 which is located between one end which travels along the heart like guiding groove and the other end which is fastened to the ejecting member. The direct engagement between the moveable end of the resilient member 52 not only urge the ejector to move along the card insertion/withdrawal direction via the pin member 54 but also make the pin member 54 in a tensioned manner in the heart like guiding groove instead of the loose manner so as to assure the reliable constant engagement between the pin member 54 and the heart like guiding groove. Moreover, because the connection position between the resilient member 52 and the pin member 54 is located between the ejecting portion where engagement between the card and the ejector 50 occurs, and the connection position between the pin member 52 and the ejecting member 53 along the transverse direction, in the instant invention the related forces application is arranged in a balanced dispersed manner in comparison with other conventional type in which the card imposes forces on one transverse end of the ejecting member, while the resilient member imposes forces on the other transverse end of the ejecting member. Understandably, the conventional type may result in an unbalanced tilted force arrangement during ejecting the card by the ejector.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector comprising:
   a metallic shell;
   an insulative housing positioned at a rear portion of the metallic shell and cooperating with said shell to form a card receiving space, said card receiving space defining an L-shaped configuration having a straight longitudinal side and an offset longitudinal side opposite to said straight longitudinal side, said offset longitudinal side defining a front outer section and a rear inner section;
   a plurality of contacts disposed in the housing and defining corresponding contacting sections extending into the card receiving space;
   an ejector assembled around the rear inner section, said ejector including a stationary base having a heart like guiding groove thereon, an ejecting member movable relative to the base along a card insertion/withdrawal direction and having an ejecting portion invading the card receiving space so as to interact with a card received in the card receiving space, a pin member having one end fastened to the ejecting member and the other end traveling along the heart like guiding groove, and a resilient member having an immoveable end and a moveable end which is directly linked to the pin member instead of to the ejecting member so as to urge the pin member along said card insertion/withdrawal direction and simultaneously make the pin member in a reliable tensional manner so as not to be dropped from the heart like guiding groove;
   wherein the ejecting portion is essentially sandwiched between the shell and the base in a vertical direction perpendicular to said card insertion/withdrawal direction.

2. The card connector as claimed in claim 1, wherein said pin member essentially extends along said card insertion/withdrawal direction while having a middle transverse section to which the corresponding end of said resilient member is linked.

3. The card connector as claimed in claim 1, wherein the immoveable end of the resilient member is fastened to the shell.

4. The card connector as claimed in claim 1, wherein a guiding structure formed between the base and the ejecting member along the card insertion/withdrawal direction so as to assure the relative movement of the ejecting member with regard to the base along said card insertion/withdrawal direction.

5. The card connector as claimed in claim 1, wherein the resilient member works in an extended manner rather than a compression manner.

6. The card connector as claimed in claim 1, wherein the ejector is essentially protectively hidden behind and under the shell.

7. The card connector as claimed in claim 6, wherein the base of the ejector is positioned at one side of the insulative housing and sandwiched between the insulative housing and the shell.

8. The card connector as claimed in claim 1, wherein a guide element is positioned between the front outer section and the rear inner section and locked with the base of the ejector to maintain the base in a stationary status.

9. The card connector as claimed in claim 8, wherein the base of the ejector defines a guiding slot therein for allowing the ejecting member moving along said card insertion/withdrawal direction.

10. The card connector as claimed in claim 1, wherein the ejecting portion is unitarily formed with the ejecting member.

* * * * *